US000001956H

(19) United States

(12) Statutory Invention Registration (10) Reg. No.: US H1956 H

Schisla et al. (43) Published: Apr. 3, 2001

(54) ENHANCED HYDROGENATION CATALYST REMOVAL FROM BLOCK COPOLYMERS BY REDUCTION IN POLYMER CEMENT VISCOSITY BY INCREASING THE VINYL CONTENT OF THE BLOCK COPOLYMERS

(75) Inventors: David Karl Schisla, Sugar Land; Michael John Modic, Houston; Eleanor Meyer de Groot, Friendswood, all of TX (US)

(73) Assignee: Shell Oil Company, Houston, TX (US)

(21) Appl. No.: 09/093,245

(22) Filed: Jun. 8, 1998

Related U.S. Application Data

(60) Provisional application No. 60/053,464, filed on Jul. 23, 1997.

(51) Int. Cl.[7] ..... C08G 69/26

(52) U.S. Cl. ..... 525/338; 525/339

(58) Field of Search ..... 525/338, 339

(56) References Cited

U.S. PATENT DOCUMENTS

| | | | |
|---|---|---|---|
| Re. 27,145 | 6/1971 | Jones . | |
| 4,577,002 | 3/1986 | Broekhuis . | |
| 5,191,024 | 3/1993 | Shibata et al. | 525/314 |
| 5,393,843 | 2/1995 | Handlin, Jr. et al. . | |
| 5,777,043 | 7/1998 | Shafer et al. | 525/339 |
| 5,925,707 | 7/1999 | Shafer et al. | 524/490 |

FOREIGN PATENT DOCUMENTS

0796871 A2 9/1997 (EP) .

OTHER PUBLICATIONS

Yih–Chau Lin, Raymond Chien–Chao Tsiang, "Using Heavy Ethers as Structure Modifiers in the Synthesis of SBS Block Copolymers in Cyclohexane," *Journal of Applied Polymer Science*, vol. 64, No. 13, Jun. 27, 1997, pp. 2543–2560.

*Primary Examiner*—Charles T. Jordan
*Assistant Examiner*—Aileen J. Baker
(74) *Attorney, Agent, or Firm*—Donald F. Haas

(57) ABSTRACT

In a process for producing hydrogenated block copolymers of conjugated dienes and/or vinyl aromatic hydrocarbons which comprises anionically polymerizing the monomers in an inert hydrocarbon solvent in the presence of an alkali metal initiator whereby a polymer cement is produced, contacting the cement with hydrogen under hydrogenation conditions in the presence of a hydrogenation catalyst, and then removing the hydrogenation catalyst residue by washing the polymer cement with water or an aqueous acid, the improvement which comprises reducing the viscosity of the polymer cement by polymerizing the block copolymer under conditions such that the vinyl content of the polymer produced in the polymerization step is in the range from 45 to 80 percent by weight.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ENHANCED HYDROGENATION CATALYST REMOVAL FROM BLOCK COPOLYMERS BY REDUCTION IN POLYMER CEMENT VISCOSITY BY INCREASING THE VINYL CONTENT OF THE BLOCK COPOLYMERS

CROSSREFERENCE TO PRIOR APPLICATION

This application claims the benefit of U.S. Provisional Application No. 60/053,464, filed Jul. 23, 1997.

FIELD OF THE INVENTION

This invention relates to the manufacture of hydrogenated block copolymers of conjugated dienes and/or vinyl aromatic hydrocarbons by anionic polymerization of these monomers in a hydrocarbon solvent. More particularly, this invention relates to an improvement in such a process whereby efficiency of the hydrogenation catalyst removal step is enhanced by reducing the viscosity of the polymer cement (the solution/slurry/suspension of the anionic polymer in the hydrocarbon solvent).

BACKGROUND OF THE INVENTION

Polymers of conjugated dienes and/or vinyl aromatic hydrocarbons have been produced by numerous methods. However, anionic polymerization of such dienes in the presence of an anionic polymerization initiator is the most widely used commercial process. The polymerization is carried out in an inert solvent such as hexane, cyclohexane, or toluene and the polymerization initiator is commonly an organo alkali metal compound, especially alkyl lithium compounds. The solvent used is almost always a non-polar hydrocarbon because such solvents are much better solvents for the conjugated diene which usually form the largest part of the block copolymers.

As the polymer is created from the monomers, a solution/slurry/suspension of the polymer forms in the inert hydrocarbon solvent. This solution/slurry/suspension is called the polymer cement. These polymerizations may be carried out at a variety of solids contents and it is reasonably obvious that if the process can be run at high solids content, the manufacturing cost will be decreased because more polymer can be produced in a given amount of time.

Unfortunately, with polymer cements of these block copolymers, one of the most significant rate limiting aspects is the viscosity of the polymer cement. For instance, in order to achieve a reasonable efficiency in the removal of hydrogenation catalyst residue from the polymer cement, the viscosity of the polymer cement must not be more than 1000 cp at 80° C. Some of the desired hydrogenated block copolymers can achieve this viscosity requirement so hydrogenation catalyst residue can be efficiently removed at 20% solids, some at 15% solids, but there are other block copolymers that can only achieve the viscosity requirement in polymer cements at close to 10% solids. The manufacturing cost of such hydrogenated block copolymers is therefore much higher. It can be seen that there would be a significant advantage achieved if a way could be found to utilize the current manufacturing technology but decrease the polymer cement viscosity for enhanced catalyst residue removal at higher solids contents so more polymer can be produced in a given amount of time.

It would be desirable to operate the process at a higher solids content in the cement if the same amount of catalyst removal could be achieved in the same amount of time. More polymer would be produced then in a given amount of time. Alternatively, it would be advantageous to be able to decrease the time it takes to remove the desired amount of catalyst residue while operating at the same solids content. The total throughput time would thus be decreased. Another result which would be highly advantageous would be to operate at the same conditions as are presently used (time, solids content, etc.) and thus remove more of the residual hydrogenation catalyst. The present invention provides a method for achieving these goals.

SUMMARY OF THE INVENTION

This invention is an improvement upon the current process for the production of block copolymers, especially hydrogenated block copolymers, of conjugated dienes and/or vinyl aromatic hydrocarbons which comprises anionically polymerizing the monomers in an inert hydrocarbon solvent in the presence of an alkali metal initiator whereby a polymer cement is produced, contacting the cement with hydrogen under hydrogenation conditions in the presence of a hydrogenation catalyst, and then removing the hydrogenation catalyst residue by washing the polymer cement with water or, preferably, an aqueous acid. This invention and the improvement to the foregoing process comprises reducing the viscosity of the polymer cement by polymerizing the block copolymer under conditions such that the vinyl content of the polymer produced is from 45 to 80 percent by weight (% wt).

DETAILED DESCRIPTION OF THE INVENTION

The term "vinyl content" refers to the fact that a conjugated diene is polymerized via 1,2-addition (in the case of butadiene—it would be 3,4 addition in the case of isoprene). Although a pure "vinyl" group is formed only in the case of 1,2 addition polymerization of 1,3 butadiene, the effects of 3,4 addition polymerization of isoprene (and similar addition for other conjugated dienes) on the final properties of the block copolymer will be similar. The term "vinyl" refers to the presence of a pendant vinyl group on the polymer chain. The purpose here is not to introduce chain branching but rather to reduce the size of the main polymer backbone (since some of the carbons in the diene are in the pendant group) which reduces the crystallinity of the molecule and, in turn, its viscosity in the cement.

As is well known, polymers containing both ethylenic and/or aromatic unsaturation can be prepared by copolymerizing one or more polyolefins, particularly a diolefin, by themselves or with one or more alkenyl aromatic hydrocarbon monomers. The polymers may, of course, be random, tapered, block or a combination of these, as well as linear, star or radial.

Polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as Group IA metals, their alkyls, amides, silanolates, napthalides, biphenyls and anthracenyl derivatives. It is preferred to use an organoalkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

Wherein:

R is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons that may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the inert hydrocarbon solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like.

The polymers of this invention may be hydrogenated as disclosed in U.S. Reissue Pat. No. 27,145, which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755, which is also incorporated herein by reference.

The catalyst residue extraction is generally carried out by washing the hydrogenated polymer cement with an aqueous acid although washing with water only has been used successfully and there are other well-known extraction methods. The aqueous acid is usually a mineral acid such as phosphoric acid or sulfuric acid. Carboxylic acids, especially citric acid, may also be used. The cement is generally mixed with the acid for a period of time after which the mixture is allowed to settle. The acid phase is then decanted from the cement phase. This step is often repeated at least once. The cement phase is then substantially free of metals.

As discussed above, the viscosity of the polymer cement has an important effect on the throughput of the polymer in the manufacture of the polymer and especially in the removal of catalyst residue subsequent to the hydrogenation of the polymer. Block copolymers of conjugated dienes and vinyl aromatic hydrocarbons generally must have a polymer cement viscosity of less than 4000 cp at 60° C. in order for the hydrogenation catalyst residue to be removed successfully in a reasonable amount of time.

There are two mechanisms that determine the viscosity of block copolymer cements. The first is the normal presence of entanglements and resistance to flow of the solvent through the polymer. The second is the presence of a network due to phase separation of the vinyl aromatic hydrocarbon (usually styrene) blocks and the diene blocks. It has been understood in the past that the known approaches to reducing the viscosity due to one of these mechanisms would increase the viscosity due to the other mechanism.

Decreasing the polymer cement viscosity as described herein does allow increased throughput through the plant and can also result in improved product quality without increasing the cost of manufacture. One approach which this invention allows is to operate at the same solids content as in current operations. The high vinyl polymer cement is lower in viscosity and the catalyst extraction can be carried out more quickly and more efficiently since the contacting and settling time required for the lower viscosity cement would be significantly less.

Alternatively, the solids content of the high vinyl polymer cement could be increased significantly to the level wherein its viscosity is at the level of the polymer cement for the conventional polymer. Under these conditions, the processing time would be the same (same settling time, etc.) but the amount of polymer actually processed would be substantially more because more polymer (by weight) would be present in the cement.

Another manner in which the process of this invention could be carried out would lead to enhanced product quality. A combination of the first two approaches could be used to accomplish this or the high vinyl polymer cement could be treated at exactly the same set of conditions as are used for the present polymer, i.e., the same solids content, mixing times, etc. The efficiency of the catalyst residue removal process would be greatly enhanced by the lower viscosity and more catalyst residue could be removed, thus producing a higher quality product at the same cost.

The microstructure of these polymers is usually controlled such that the vinyl content of the polymers is in the range of 35 to 45% wt to maximize elastic properties. It has been discovered that if these polymers are made with a much higher vinyl content, at least 45 to 80% wt, the viscosity of the polymer and especially the polymer cement is considerably lower, all other factors, such as overall molecular weight, block molecular weights, polystyrene content, and other polymerization conditions, remaining the same. In other words, if the same polymer is made with a vinyl content within this range, its polymer cement will have a considerably lower viscosity and, when it is hydrogenated, the efficiency of the catalyst residue removal could be enhanced. Also, the manufacturing plant throughput should also be increased by increasing the polymer cement concentration and yet maintaining a cement viscosity equal to or less than that for an equivalent polymer with a lower vinyl content.

Microstructure control of conjugated diene polymers or conjugated diene polymer blocks within polymers is important because a controlled degree of branching in the polymer is desirable. If, such as in the case of butadiene, the diene in the polymer is all straight chain, i.e., no vinyl content, such as 1,4-polybutadiene, when the polymer is hydrogenated it will be polyethylene and have crystallinity. In order to achieve good thermoplastic elastomeric properties in the polymer, it is desirable that the microstructure include a uniform specific degree of branching or vinyl content, such as 1,2-butadiene possesses.

The general method for microstructure control is commonly affected by including a microstructure control agent in the polymerization mixture. In general, from 100 ppm to 10% wt of the microstructure control agent is used during the polymerization of the polymer although sometimes the entire solvent used can be a microstructure modifier (i.e., tetrahydrofuran). The desired level of vinyl content is achieved by properly selecting the type and the amount of these microstructure control agents, which are commonly Lewis basic compounds, and then carefully controlling the temperature and process conditions of the polymerization reaction. Such compounds have included ether compounds and tertiary amines. Examples include cyclic ethers such as tetrahydrofuran, tetrahydropyran and 1,4-dioxane; aliphatic monoethers such as diethyl ether and dibutyl ether; aliphatic polyethers such as ethylene glycol dimethyl ether, ethylene glycol diethyl ether, ethylene glycol dibutyl ether, diethylene glycol diethyl ether and diethylene glycol dibutyl ether; aromatic ethers such as diphenyl ether and anisole; tertiary amine compounds such as triethyl amine, tipropyl amine, tributyl amine; and other compounds such as N,N,N',N'-tetramethylethylene diamine, N,N-diethyl aniline, pyridine and quinoline.

Many microstructure control agents can be used to advantage in the process of the present invention. These include the aforementioned compounds and heavy ethers which are difficult to use in the present practice because they are temperature sensitive. Such heavy ethers include 1,2-diethoxyethane, 1,2-diethoxypropane, orthodimethoxybenzene, 1,2-di-n-butoxyethane, 1-t-butoxy-2-n-butoxyethane, furfuryl ehters, $n\text{-}C_4H_9OCH_2CH_2O\text{-}n\text{-}C_4H_9$, $n\text{-}C_4H_9OCH_2CH_2OCH_2OCH_3$, $n\text{-}C_4H_9OCH_2CH_2OCHCH_3OCH_2CH_3$, $n\text{-}C_4H_9OCH_2CH_2O\text{-}t\text{-}C_4H_9$, $n\text{-}C_4H_9OCH_2CH_2OCHCH_3\text{-}O\text{-}i\text{-}C_4H_9$. These are heavy ethers which are stronger and can be used in smaller amounts than the presently used diethyl ether and thus, do not require recovery, storage and pre-treating facilities, making the overall process less expensive to operate. They can be separated from solvents like isopentane. In fact, it is preferred that from 100 ppm to 500 ppm of the heavy ethers be used as the microstructure control agent to achieve the desired vinyl content. This amount may be split equally between the different doses of the agent which are added to the polymerization mix or varying amounts may be added at various points as required or it may be added continuously. 1,2-diethoxypropane (DEP) is preferred for use herein because it allows one to obtain vinyl contents of 60 to 80% wt while polymerizing at reasonably fast reaction rates at moderate temperatures (i.e., 40 to 60° C.).

Before the process of this invention is carried out, the desired final vinyl content of the polymer must be chosen and the temperature profile of the reaction must be determined. The temperature is determined by the temperature of the feed and the total heat release during the reaction. Next, the temperature/vinyl content/concentration relationship for the desired microstructure control agent is utilized. This is determined by reacting the monomers with the agent at different temperatures and measuring the vinyl contents.

EXAMPLES

Example 1

A styrene-butadiene-styrene block copolymer was anionically polymerized according to the general procedure described above. First, styrene was polymerized in the reactor in the presence of sec-butyllithium. In the second step, 1,2-diethoxypropane (DEP), cyclohexane, and 50 percent of the required butadiene were charged to the second step reactor. The polymerization was then allowed to proceed for 20 minutes after introducing the living polystyrene polymer from the first step. The remaining butadiene was then added over a period of 20 minutes. The target temperature was maintained at 45° C. to within −2° C. and +5° C. of the last half of the butadiene. The vinyl content was measured using $^1$HNMR (this method give a value averaged over the entire diene block).

The results in Table 1 below suggest that a vinyl content greater than 70 percent can be obtained at DEP concentrations of 300 to 400 ppm and temperatures between 45 and 50° C. The vinyl concentration falls below 70 percent for temperatures above 50° C. within this range of DEP concentration. However, operation at 800 ppm DEP does allow for operation at a higher temperature to achieve the 70 percent vinyl content goal. Unfortunately, the rate of propagation (polymerization) is not significantly faster at this higher concentration and temperature.

TABLE 1

| Run Number | DEP Concentration (ppm) | Target Temperature (° C.) | Vinyl Content (%) |
|---|---|---|---|
| 1 | 800 | 55 | 77 |
| 2 | 400 | 50 | 78 |
| 3 | 300 | 45 | 73 |
| 4 | 350 | 45–50 | 71 |

The third step of the process was then carried out. In this step, styrene was polymerized on the end of the styrene-butadiene living polymer produced in the second step. These polymers were then hydrogenated and subjected to catalyst residue removal treatment.

An extraction of catalyst residue from one of the polymers made according to the present invention from Table 1 was carried out at 14.4 weight percent solids polymer cement, 82° C., a phosphoric acid concentration of 1.5 weight percent, a phase ratio of 0.35, two washes at contact times of 35 and 20 minutes and settle times 20 and 40 minutes. The performance of the polymer of the present invention was better than the control experiment done with the prior art polymer having a vinyl content of 38% wt under identical conditions and in the same equipment in terms of nickel removal efficiency and residual acid entrainment.

Example 2

The data from this series of experiments is summarized in Table 2 below. At DEP concentrations ranging from 300 to 390 ppm and temperatures ranging from 48 to 52° C., the vinyl content ranged from 69.3 to 74.1 percent. The butadiene version was essentially complete after 67 minutes of reaction time. The overall reaction rate through the third step of the process, i.e., the polymerization of the second polystyrene block, was comparable to the reaction rate for the same SBS block copolymer—vinyl content of 38 percent.

TABLE 2

| Run Number | DEP Concentration (ppm) | Target Temperature (° C.) | Vinyl Content (%) |
|---|---|---|---|
| Prior Art Polymer | — | 60 | 38 |
| 5 | 252 | 45 | 71.1 |
| 6 | 361 | 48 | 73.5 |
| 7 | 391 | 49 | 74.2 |
| 8 | 347 | 50 | 72 |
| 9 | 306 | 49 | 71.1 |
| 10 | 345 | 52 | 72.8 |
| 11 | 339 | 50 | 72.2 |
| 12 | 362 | 50 | 71.9 |
| 13 | 315 | 50 | 69.3 |
| 14 | 288 | 52 | 68.8 |
| 15 | 329 | 52 | 70 |

reduced to below 1 ppm after two washes in many cases whereas it typically takes three washes before a level of 1 ppm of nickel can be achieved using the prior art polymer. The extent of nickel extraction is improved with the high vinyl polymer cement after both the first and second wash when compared to the prior art. In summary, the wash step utilized for the polymers of the present invention was run at the same rate as normally used for the prior art polymer and still gave more efficient metals extraction. Furthermore, while the polymers of the invention do not exhibit lower phosphate levels after the second wash, after subsequent final processing of the polymers, the higher vinyl content polymers exhibit a lower level of phosphate than does the prior art polymer.

Example 4

Measurements show that the viscosity of a cement containing an about 70% wt vinyl content polymer is 200 cp at 14% wt polymer and 600 cp at 20% wt polymer (at 60° C.). The same polymer with a vinyl content of only 40% wt has a cement viscosity of 2500 cp at 14% wt solids and 60° C. Hence, for the high vinyl polymer cement, the concentration can be increased from 14 to at least 20% wt and yet the viscosity remains less than that of the 14% wt cement of the lower vinyl content polymer. Because the wash step should take the same time for two cements of similar viscosity, the higher vinyl content cement at the higher concentration will give approximately a 40% increase in production rate while achieving comparable product quality.

TABLE 3

| Run No. | Visc. Trans. in. | 1st Mix Time (min) | Mixer Speed (rpm) | 1st Settle Time (min) | Cement Ni (ppm) | Cement $H_3PO_4$ (ppm) | Entrained Water (wt %) | 2nd Mix Time (min) | Mixer Speed (rpm) | 2nd Settle Time (min) | Cement Ni (ppm) | Cement Ni (ppm) | Cement $H_3PO_4$ (ppm) | Entrained Water (wt %) |
|---|---|---|---|---|---|---|---|---|---|---|---|---|---|---|
| Prior Art | 900 | 30 | 100 | 40 | 5.9 | 1270 | 1.62 | 25 | 100 | 40 | 1.24 | | 130 | 0.7 |
| 5 | 350 | 25 | 100 | 40 | 1.4 | 179 | 0.7 | 25 | 100 | 40 | 0.69 | 0.69 | 308 | 1.4 |
| 6 | 365 | 25 | 100 | 40 | 4 | 155 | 0.6 | 25 | 100 | 40 | 0.69 | 0.69 | 240 | 0.7 |
| 7 | 370 | 25 | 100 | 40 | 3.7 | 167 | 0.5 | 25 | 100 | 40 | 1.2 | 1.2 | 194 | 0.7 |
| 8 | 365 | 35 | 100 | 50 | 2.1 | 175 | 0.6 | 25 | 100 | 40 | 0.92 | 0.92 | 188 | 0.5 |
| 9 | 359 | 25 | 100 | 40 | 2.9 | 129 | 0.46 | 25 | 100 | 40 | 2.51 | 2.51 | 157 | 0.43 |
| 10 | 357 | 30 | 60 | 40 | 5.01 | 39 | 0.1 | 30 | 100 | 40 | 1.21 | 1.21 | 191 | 0.7 |
| 11 | 359 | 30 | 100 | 40 | 2.15 | 154 | 0.6 | 30 | 100 | 40 | 0.87 | 0.87 | 177 | 0.4 |
| 12 | 354 | 30 | 100 | 40 | | | | 30 | 100 | 40 | 0.72 | 0.72 | 167 | 0.73 |
| 13 | 357 | 30 | 60 | 40 | 1.81 | 39 | 0.23 | 30 | 60 | 40 | 2.02 | 2.02 | 86 | 0.33 |
| 14 | 365 | 30 | 100 | 40 | | | | 30 | 100 | 40 | 0.5 | 0.5 | 168 | 0.65 |
| 15 | 372 | 30 | 100 | 40 | | | | 30 | 100 | 40 | 0.64 | 0.64 | 244 | 0.47 |

Example 3

All of the polymers shown in Table 2 were then hydrogenated under similar conditions using a nickel octonoate/aluminum triethyl catalyst. All of the polymers made according to the present invention described in Table 2 were then treated to remove the hydrogenation catalyst residue from the polymer cement. The basic method of treatment is as described above in Example 1. There was a first wash with phosphoric acid and then a second wash again with phosphoric acid. The results of the metals extraction are shown in Table 3 below. The comparable prior art polymer having a vinyl content of 38% had a polymer cement viscosity of 2500 cp at 60° C. which is considerably higher than the polymer cement viscosities of any of the invention polymer cements shown in Table 3. The nickel extraction efficiency for the polymers of the present invention is improved over that of the prior art polymer since it can be seen that the nickel cement concentrations are typically

We claim:

1. In a process for producing hydrogenated block copolymers of conjugated dienes and/or vinyl aromatic hydrocarbons which comprises anionically polymerizing the monomers in an inert hydrocarbon solvent in the presence of an alkali metal initiator whereby a polymer cement is produced, contacting the cement with hydrogen under hydrogenation conditions in the presence of a hydrogenation catalyst, and then removing the hydrogenation catalyst residue by washing the polymer cement with water or an aqueous acid, the improvement which comprises reducing the viscosity of the polymer cement by polymerizing the block copolymer under conditions such that the vinyl content of the polymer produced in the polymerization step is in the range from 45 to 80 percent by weight.

* * * * *